United States Patent [19]
Okura

[11] 4,367,939
[45] Jan. 11, 1983

[54] AUTOMATIC APERTURE PRESETTING DEVICE

[75] Inventor: Zenichi Okura, Ichikawa, Japan

[73] Assignee: Asahi Kogaku Kogyo Kabushiki Kaisha, Tokyo, Japan

[21] Appl. No.: 276,743

[22] Filed: Jun. 24, 1981

[30] Foreign Application Priority Data

Jul. 15, 1980 [JP] Japan .............................. 55-99388[U]

[51] Int. Cl.³ .............................................. G03B 9/07
[52] U.S. Cl. ..................................... 354/272; 354/274
[58] Field of Search ................................ 354/270–274

[56] References Cited
U.S. PATENT DOCUMENTS 4,152,064 5/1979 Hashimoto et al. .

*Primary Examiner*—John Gonzales
*Attorney, Agent, or Firm*—Sughrue, Mion, Zinn, Macpeak and Seas

[57] ABSTRACT

An automatic aperture presetting device for a camera lens having a crank lever pivotally mounted on a preset ring which is rotatable around the optical axis of the lens. The end of one arm of the lever is in abutment against the edge of a cam which is mounted on a stationary lens barrel while the end of the other arm of the lever is operatively coupled to a stop member of an aperture operation ring which is driven from a corresponding member on the camera body side to thereby obtain an automatic aperture value corresponding to a set position of the preset ring.

4 Claims, 2 Drawing Figures

AUTOMATIC APERTURE PRESETTING DEVICE

BACKGROUND OF THE INVENTION

The invention relates to an automatic aperture presetting device for a camera lens in which the amount of presetting operation is made large.

In recently-manufactured single-lens reflex cameras, the aperture is maintained open very wide to provide a bright image through the finder until the shutter is released. When the shutter is released, an aperture drive member on the camera body side is activated to operate the aperture operation member on the lens side thereby to stop down the lens to an aperture value which has been set manually or automatically in advance.

In the case of a so-called "EE camera" in which such an aperture value is automatically preset, in order to provide a preset value corresponding to a metered value, it is necessary that a presetting operation be carried out in association with the measured value. In order to achieve this operation with a high degree of accuracy, it is desirable that the amount of presetting operation be large to a certain extent.

SUMMARY OF THE INVENTION

In accordance with this requirement, with the invention, an aperture opening and closing ring is operated through a cam in association with aperture blades so that an aperture operation ring has a sufficiently large operation angle. A crank-shaped lever which is turned and preset to perform a stopping action corresponding to the operation angle and the edge of a cam abutted against the lever are employed, whereby the presetting operation is carried out manually or automatically in association with a metered value. The invention is considerably effective in the resolution of a set value and a stop-down value and in the stability of the stopping operation.

DESCRIPTION OF THE PREFERRED EMBODIMENTS

Figure 1:
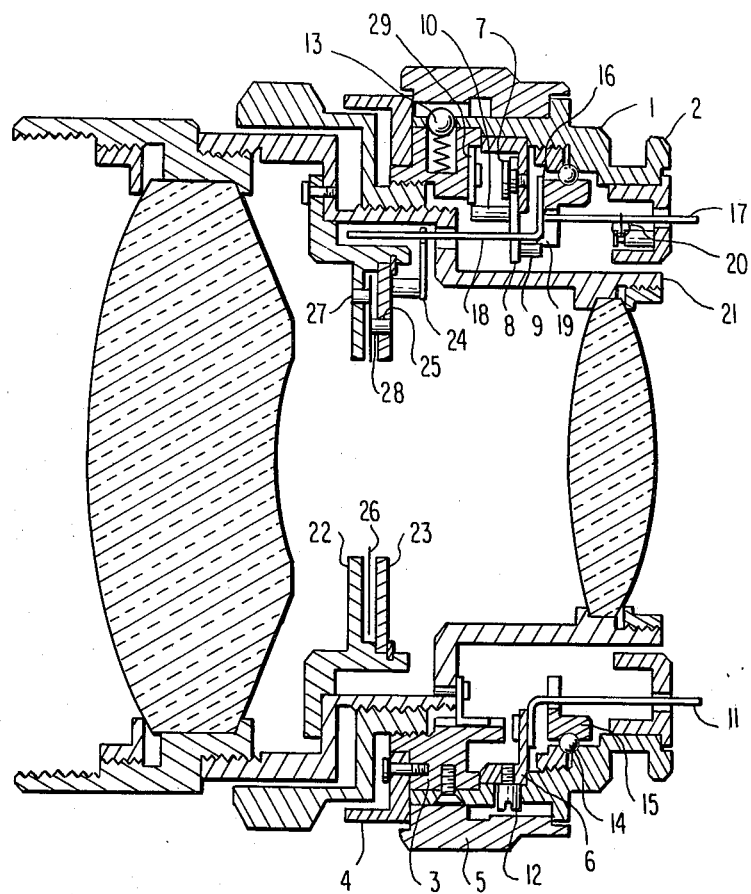
FIG. 1 is a sectional view showing the central components of an automatic aperture presetting device constructed according to the present invention.
Figure 2:
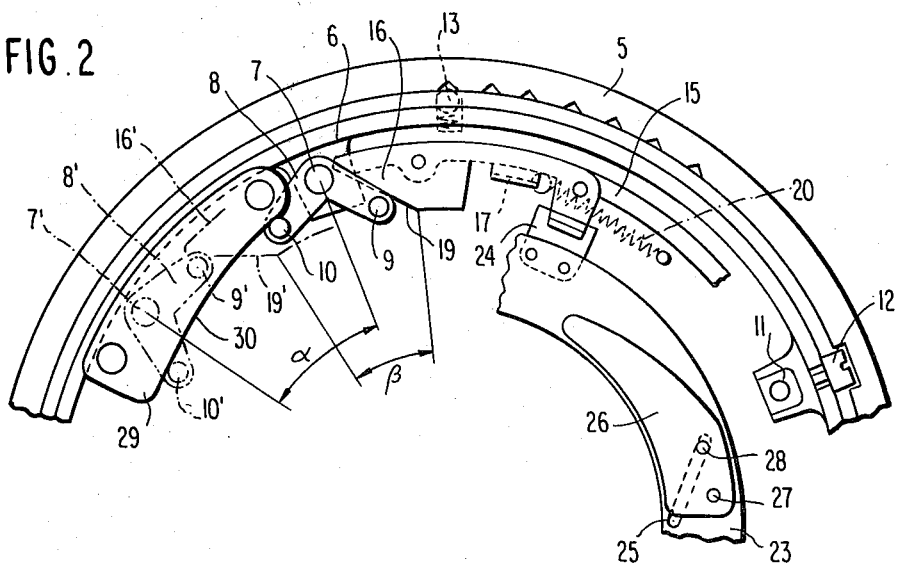
FIG. 2 is a partial front view showing the central components of an automatic aperture presetting device constructed according to the present invention.

A preferred embodiment of the invention will be described in more detail with reference to the drawings.

A coupling ring 3 and an index ring 4 are provided integrally with a bayonet ring 1 having a pawl 2 which is engaged with a camera body. An aperture preset inner ring 6 engaged with an aperture preset outer ring 5 and an aperture operation ring 15 supported by a ball bearing 14 are rotatably arranged around the optical axis. The aperture preset outer ring 5 and the aperture preset inner ring 6 are engaged with each other through a threaded pin 12 and are coupled to the camera body through a coupling plate 11 secured to the inner ring 6 to automatically preset an aperture value and to display photometric data in the viewfinder of the camera. The aperture preset rings are click-stopped by a click stop ball 13 provided in the bayonet ring 1 such that any selected one of the aperture value marks (not shown) on the outer wall thereof is held at a position aligned with the index mark on the index ring.

A stop-down control plate 16 is coupled integrally with an arm 17 which is operated in association with the aperture drive member on the camera body side. The stop-down control plate 16 is mounted on the aperture operation ring 15. The plate 16 is engaged with a fork 24 integral with an aperture opening and closing ring 23 through an arm 18 of the plate 16. The plate 16 is normally held at the open position by the elastic force of a spring 20. However, when the camera shutter is released, the plate 16 is stopped down to the preset value by a driving force provided on the camera body side which overcomes the elastic force of the spring.

The mating part of the aperture opening and closing ring 23 is an aperture blade supporting ring 22 which is secured to a lens supporting ring 21. A plurality of aperture blades 26 to which pins 27 and 28 are fixedly secured are held between the rings 23 and 22, with the pins 28 and 27 engaged in respective ones of cam grooves 25 cut in the aperture opening and closing ring and loosely fitting holes cut in the aperture blade supporting ring.

Control pins 9 and 10 are fixedly secured to a crank lever 8. The crank lever 8 is pivotally supported through a shaft 7 by the aperture preset inner ring 6 which is engaged with the aperture preset outer ring 5. The pin 9 is abutted against a slanted surface 19 of the stop-down control plate 16 while the other pin 10 is abutted against an abutting surface cam 30 of a preset value regulating plate 29 which is secured to the coupling ring 3 in the stationary section for stopping the lens stop-down operation. By selectively combining the cam configuration of the preset value regulating plate 29, the angle of the arms of the crank lever 8 and the angle of inclination of the abutting surface 19 of the stop-down control plate 16, the transition of the stopped-down aperture, corresponding to equal intervals of a suitable preset operation angle, can be made linear with regard to the exposed factor. This is considerably effective for an EE camera. Furthermore, generally, the degree of freedom in selection of these angles is large in the narrow annular space in the lens barrel, and the employment of the crank lever causes the rotational impact in the lens stopping down operation to be absorbed as a radial impact. This is effective in maintaining a stable preset value.

What is claimed is:

1. An automatic aperture presetting device for a camera lens comprising: a preset ring which is rotatable around an optical axis of said lens; a crank-shaped lever pivotally mounted on said preset ring, said crank-shaped lever having first and second arms; a stationary lens barrel; a cam mounted on said stationary lens barrel; an aperture operation ring adapted to be driven from a camera body side for setting an automatic aperture value corresponding to a set position of said preset ring, a stop member being formed integrally with said aperture operation ring; wherein an end of said first arm of said lever is in abutment with an edge of said cam mounted on said stationary lens barrel and an end of said second arm is operatively coupled to said stop member.

2. The automatic aperture presetting device of claim 1 wherein a configuration of said cam, an angle between said first and second arms of said crank-shaped lever, and an angle of inclination of said stop member are determined such that transitions of a stopped-down aperture of said lens are linear with respect to an exposure factor.

3. An aperture presetting device for a camera lens comprising: a coupling ring, an index ring, and a bayonet ring having a pawl adapted to be engaged with a camera body, said coupling ring, said index ring and said bayonet ring being coupled integrally with one another; an aperture preset inner ring, an aperture preset outer ring and an aperture operation ring coupled operatively with one another, said aperture operation ring being supported by a ball bearing, said aperture preset inner ring, said aperture preset outer ring, and said aperture operation ring being rotatably arranged around an optical axis of said lens; a coupling plate secured to said inner ring adapted to be coupled to said camera body to automatically preset an aperture value; a click stop ball for click stopping said aperture preset outer ring and said aperture preset inner ring, said click stop ball being provided in said bayonet ring; a stopped-down control plate having an arm adapted to be operated in associated with an aperture drive member on said camera body side; said stopped-down control plate being mounted on said aperture operation ring; an aperture opening and closing ring, said stop-down control plate beint engaged with a fork integral with said aperture opening and closing ring through an arm of said stopped-down control plate; a spring for holding said stop-down control plate normally at an open position; a movable lens supporting ring; an aperture blades supporting ring secured to said lens supporting ring, aperture blades operatively associated with and supported between said aperture opening and closing ring and said aperture blades supporting ring; a crank lever pivotally supported through a shaft on said aperture preset inner ring, said crank lever having first and second arms each having a control pin fixedly secured at an end thereof, said control pin at said end of said first arm abutting against a slanted surface of said stop-down control plate; and preset value regulating plate secured to said coupling ring for performing a lens stop-down operation, said pin at said end of said second arm of said crank lever abutting against an abutting surface cam of said preset value regulating plate.

4. The automatic aperture preset ring device of claim 3 wherein said abutting surface cam of said preset value regulating plate, an angle between said first and second arms of said crank lever and an angle of inclination of said slanted surface of said stop-down control plate being determined such that a transition of the stop-down aperture corresponding to equal intervals of a predetermined preset operation angle is linear with respect to an exposutre factor.

* * * * *